(12) United States Patent
Stobbe

(10) Patent No.: US 7,017,274 B2
(45) Date of Patent: Mar. 28, 2006

(54) MULTI-TURN ANGLE TRANSDUCER

(75) Inventor: Willibald Stobbe, Donaueschingen (DE)

(73) Assignee: SICK Stegmann, Donaueschingen (DE)

( * ) Notice: Subject to any disclaimer, the term of this patent is extended or adjusted under 35 U.S.C. 154(b) by 185 days.

(21) Appl. No.: 10/642,428

(22) Filed: Aug. 14, 2003

(65) Prior Publication Data

US 2004/0256545 A1 Dec. 23, 2004

(30) Foreign Application Priority Data

Aug. 19, 2002 (DE) .............................. 102 38 640

(51) Int. Cl.
*G01B 7/30* (2006.01)
*G01D 5/34* (2006.01)

(52) U.S. Cl. .................. 33/1 PT; 33/706; 324/207.25; 341/2

(58) Field of Classification Search .................. 33/1 N, 33/1 PT, 706, 707, 708; 324/207.2, 207.21, 324/207.25; 341/2, 13, 15; 116/293; 250/231.15, 250/231.18
See application file for complete search history.

(56) References Cited

U.S. PATENT DOCUMENTS

| | | | | |
|---|---|---|---|---|
| 3,139,612 | A | * | 6/1964 | Allen ............................ 341/2 |
| 4,716,290 | A | * | 12/1987 | Ogawa ................... 250/231.18 |
| 4,740,690 | A | * | 4/1988 | Mosier ................... 250/231.18 |
| 4,870,559 | A | * | 9/1989 | Hyatt ............................ 700/1 |
| 5,642,297 | A | * | 6/1997 | Brady et al. ................. 702/152 |
| 6,246,232 | B1 | * | 6/2001 | Okumura ................... 324/207.2 |
| 6,861,837 | B1 | * | 3/2005 | Shimizu et al. ......... 324/207.25 |
| 6,862,946 | B1 | * | 3/2005 | Sumita et al. ............. 74/421 A |
| 2003/0112157 | A1 | * | 6/2003 | Strasser .......................... 341/2 |

FOREIGN PATENT DOCUMENTS

DE 2817172 C2 10/1979

(Continued)

*Primary Examiner*—R. Alexander Smith
(74) *Attorney, Agent, or Firm*—Townsend and Townsend and Crew LLP

(57) ABSTRACT

A multiturn angle measuring device (1) with a first dimensional standard (9) that is non-rotatably connected to an input shaft (2) and which is sampled by a first scanning unit (10) to determine the angular position of the input shaft. Additional dimensional standards (11, 12, 13) measure the number of turns of the input shaft (2) and are arranged in parallel to each other. The rotational speed of each additional dimensional standard (11, 12, 13) is reduced by means of a reduction gearing from the preceding dimensional standard (9, 11, 12). A scanning device (21, 22, 23) for the sampling of each dimensional standard (11, 12, 13) is arranged on a circuit board (6). To provide a multiturn shaft encoder able to measure a high number of turns, even at high rotational speeds and/or large diameter input shafts, with compact construction and comparatively few multiturn stages, the input drive gear (40) fixed to the input shaft (2) and the first driven transmission gear (41) have axes of rotation ($D_{40}$, $D_{41}$) that are not parallel to each other. The flanks of the teeth ($Z_{40}$, $Z_{41}$) of the input drive gear (40) and of the wheel (411) of the first driven transmission gear (41) are not parallel to the axes of rotation ($D_{40}$, $D_{41}$) of the respective gears (40, 41), and the number of teeth ($Z_{40}$) of the input gear (40) is smaller than the number of teeth ($Z_{41}$) of the wheel (411) of the first transmission gear (41). The following transmission gears are again arranged parallel to the input shaft, and the drive pinion (412) of the first transmission gear (41) and the driven wheel of the second transmission gear (31) have helical gears.

7 Claims, 2 Drawing Sheets

FOREIGN PATENT DOCUMENTS

| | | |
|---|---|---|
| DE | 3429648 C2 | 10/1987 |
| DE | 10001676 C1 | 7/2001 |
| DE | 100 60 574 A | 6/2002 |
| DE | 10060574 A1 | 6/2002 |
| EP | 1108987 A1 | 6/2001 |
| JP | 11287634 A | 10/1999 |
| JP | 2001 289671 A | 4/2002 |
| JP | 2002-131049 A | 5/2002 |

* cited by examiner

MULTI-TURN ANGLE TRANSDUCER

BACKGROUND OF THE INVENTION

Multi-turn angle measuring devices are electromechanical sensors which detect absolutely several revolutions; i.e., within the resolution of the device the distinct angular position is always available even after the device has been switched on and completed several revolutions. Such angle measuring devices are used to measure shafts and axles and for positioning and control of electric motors in industry, especially in connection with manufacturing and handling machinery.

Multi-turn shaft encoders preferably have a compact construction and a high number of distinctly detectable turns. DE 28 17 172 C2 describes a shaft encoder which has a compact footprint in that the multi-turn dimensional standards are driven by a spur reduction gear and lie within the circumferential region of the single code disk. In this case, the sensors for detection of the multi-turn and the single-turn rotational movements, or scales, are arranged on different circuit boards.

DE 34 29 648 C2 describes a multi-turn shaft encoder which is used to scan an optical single code disk and another optical multi-turn code disk which are arranged within the circumferential region of the single code disk, which are arranged on one circuit board. Here as well, spur gears with axes of rotation parallel to that of the input shaft are used for the reduction.

A multi-turn shaft encoder is also disclosed in DE 100 60 574 A1, which uses detectors arranged on a circuit board for the detection of single and multi-turn code carriers.

In the turn counter described in DE 100 01 676 C1, reed contacts arranged along a circumferential region of an input shaft are activated by means of a magnet rotating with the input shaft and generating counting pulses. Such so-called counting multi-turn shaft encoders, however, require a backup battery for counting when power is off. The reed contacts are subject to mechanical wear and therefore have only a limited lifetime. Moreover, the battery takes up space and must therefore be positioned outside the sensor housing when the size of the multi-turn shaft encoders must be kept small.

The reduction gearings of known mechanical multi-turn shaft encoders are configured as spur gearings with gear turning axes that are parallel to the input shaft. When the input shaft has a large diameter, therefore, the driven gear of the first multi-turn stage must have an even larger diameter than the one mounted on the input shaft in order to accomplish a reduction. However, this requires a much larger footprint. Otherwise the rotational speed of the first driven gear will be even higher than the rotational speed for the gear fixed to the input shaft. Accordingly, a high rotational speed of the input shaft results in greater wear of the gears which leads to a reduced lifetime for the multi-turn angle measuring device.

SUMMARY OF THE INVENTION

It is an object of the present invention to develop a multi-turn shaft encoder of compact construction and with relatively few multi-turn stages, which is capable of measuring a high number of rotations at high rotational speed and/or large diameter of the input shaft.

This object is attained with the features of claim 1.

The multi-turn angle measuring device of the invention has a first dimensional standard, which is non-rotatably connected to the input shaft, and which is sampled by a first scanning unit that determines the angular position of the input shaft. Additional dimensional standards measure the number of turns of the input shaft, each successive dimensional standard being reduced by means of reduction gearing from the preceding dimensional standard, and they are arranged parallel to each other. There is one scanning device for each dimensional standard arranged on a circuit board. According to the invention, the driven or input gear connected to the input shaft and the transmission gear driven by the input gear have axes of rotation that are not parallel to each other, and the flanks of the teeth of the input gear and of the driven gear do not run parallel to the axis of rotation of the particular gear. Furthermore, the number of teeth on the input gear is less than the number of teeth of the driven gear. The following transmission gears are again arranged parallel to the input shaft. The drive gears and the driven gears of the first and second gear transmissions are spiral-tooth (worm) gears.

Thus, the driven gear of the first gear transmission stage is spirally geared to both the first input gear, joined to the input shaft, and to the driven gear of the second gear transmission stage. The drive gear of the first stage transmission can be slanted with respect to both the first drive gear and the remaining transmission gears, which in turn are arranged parallel to the input shaft. In this manner, sufficient gear reductions can be attained even for large input diameters, such as hollow shafts for example, while the footprint of the device remains small because the first driven gear can be arranged at an angle, such as 90°. This avoids the above-mentioned disadvantages.

Benefits of the present invention are that even high rotational speeds can be measured, especially those of input shafts with large diameter, because of the high speed reduction at the first transmission stage, which enables a very compact construction for the multi-turn shaft encoder. Moreover, in such an arrangement the sensing units to detect the dimensional standards of the single and multi-turn stages can be arranged on a single circuit board.

Advantageous embodiments of the invention are set forth in the dependent claims.

Advantageously, the drive gear connected to the input shaft and the drive wheel of the second gear transmission stage which drives the other transmission gears are also helical gears.

When the scanning unit of the first dimensional standard and the scanning units of the other dimensional standards are arranged on a single circuit board, considerable space can be saved and the shaft encoder is rendered more compact.

In a further aspect of the invention, the other dimensional standards are centrally carried by gears having axes of rotation that are parallel to that of the input shaft, with additional intermediate gears arranged between them. The gears can be mounted on a single-piece multi-turn unit.

In another embodiment of the invention, the other dimensional standards are diametrically magnetized permanent magnets.

Advantageously, the first dimensional standard is a transmissive Moiré code disk, which is illuminated by a transmitter, and which is detected by means of a photoelectric scanning unit.

As an alternative, the first dimensional standard can consist of one or more magnets, which are magnetized in sectors and detected by one or more magnetic sensors.

BRIEF DESCRIPTION OF THE DRAWINGS

An example of the invention is shown in the following explained drawings. The drawings show.

DESCRIPTION OF THE PREFERRED EMBODIMENTS

Figure 1:
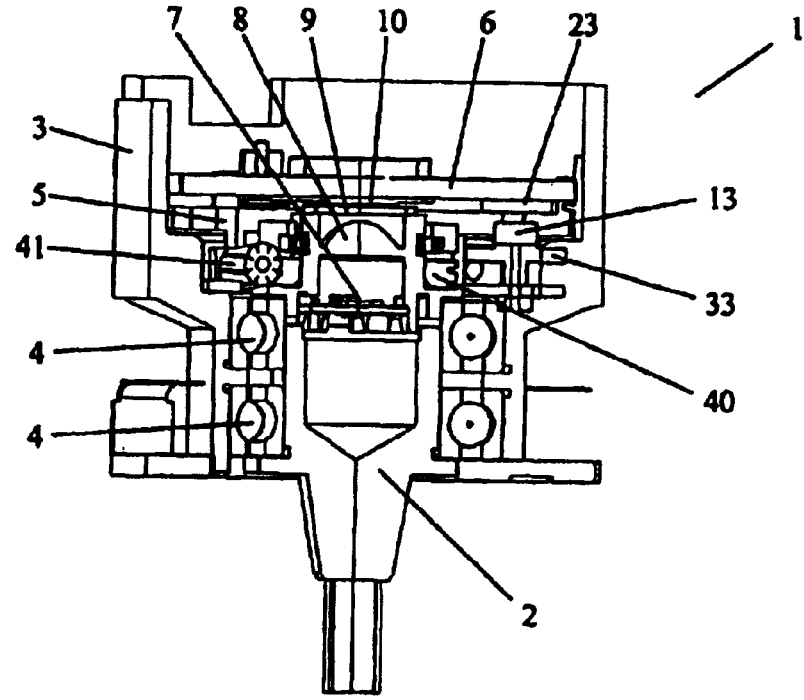
FIG. 1 is a schematic layout of a multi-turn shaft encoder in cross section.

A multi-turn angle measuring device 1 comprises a few modular components. It has a housing 3, an input shaft 2, a code disk 9 connected to the latter, a multi-turn transmission unit 5 and a circuit board 6 on which are arranged the scanning units for detection of the code disk 9, as well as the multi-turn dimensional standards 11, 12, 13.

In order to measure the absolute angular position of the input shaft 2 over one turn, the code disk 9 is illuminated by a phototransmitter 7 and detected by a scanning unit 10. The phototransmitter preferably is a light-emitting diode (LED).

The optical code disk 9 carries an absolute binary code, preferably a gray code or a sequential code, which can be formed by light/dark windows. For transmissive sampling, the encoding can be in the form of a thin, photolithographically structured chromium layer on a glass substrate. In addition, an incremental code track can be arranged on the code disk 9, consisting of the highest possible number of division periods for a high angular resolution of the multi-turn angle measuring device 1.

The input shaft 2 is mounted rotationally with respect to the shaft encoder housing 3, is preferably carried by ball bearings 4, and has an input drive gear 40 for reducing the speed of the first driven gear 41 of multi-turn transmission unit 5. Input gear 40 necessarily has an axis of rotation parallel to that of input shaft 2. The first driven gear 41 of the multi-turn stage 5, however, has an axis of rotation that is not parallel to the axis of rotation of input drive gear 40. Preferably, the first gear transmission stage, consisting of the input drive gear 40 connected to the input shaft 2 and the first driven gear of the multi-turn stage 5, is a helical transmission with axes of rotation arranged at 90° from each other.

If the number of teeth of input drive gear 40 is smaller than the number of teeth of the first driven transmission gear 41, the speed of the input gear 40 will be reduced.

The input gear 40 connected to the input shaft 2 and the first driven gear 41 have axes of rotation $D_{40}$ and $D_{41}$ that are not parallel to each other. The flanks of the teeth $Z_{40}$ of the drive gear 40 and the flanks of the teeth $Z_{41}$ of the driven wheel 411 of gear 41 are not parallel to the axes of rotation, $D_{40}$ or $D_{41}$, of gears 40 and 41. The number of teeth $Z_{40}$ of the input gear 40 is smaller than the number of teeth $Z_{41}$ of wheel 411 of the first driven gear 41, and the following transmission gears are again arranged parallel to input shaft 2. Pinion 412 of first driven gear 41 and the input wheel of the second transmission gear 31 are configured as helical gears.

Thus, the first driven gear 41 is helically toothed to both input gear 40, connected to the input shaft 2, and the second transmission gear 31. Thus, the first driven gear 41 can be oriented skewed to input gear 40 and skewed to the other transmission gears, which are in turn oriented parallel to the input shaft 2.

Figure 2:
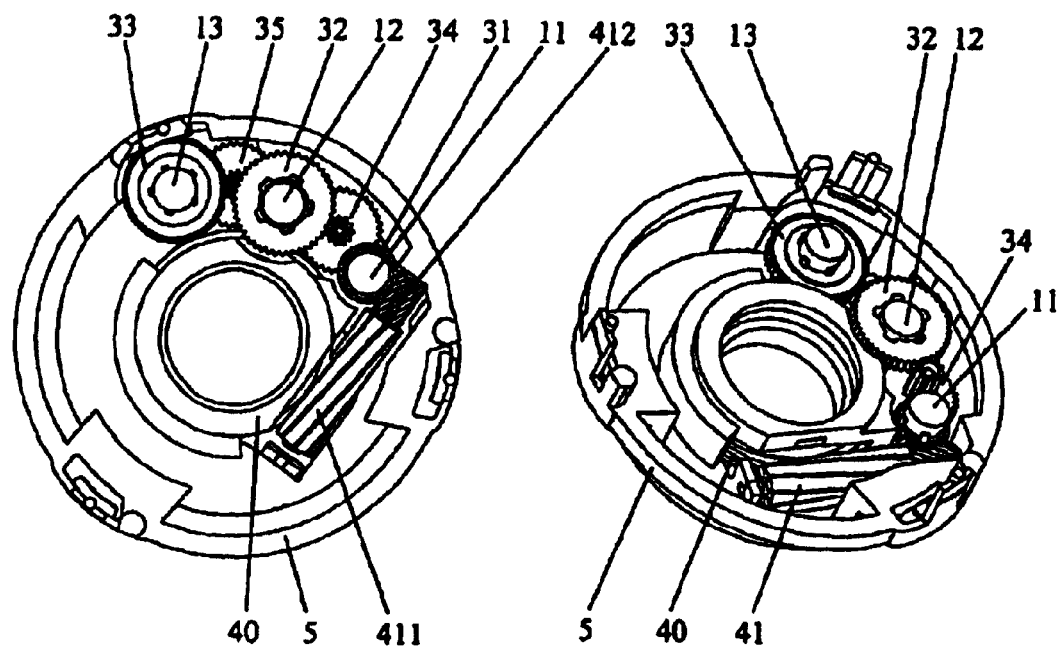
FIG. 2 shows the multi-turn transmission unit from different perspectives.
Figure 3:
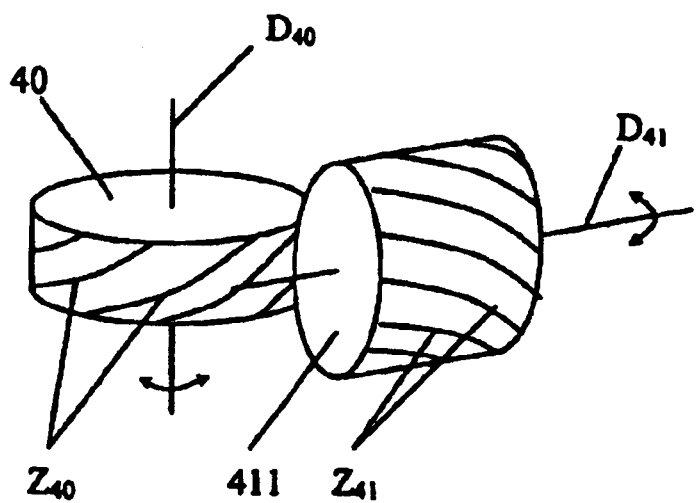
FIG. 3 schematically shows the configuration of a gear.

The multi-turn transmission unit is represented in FIG. 2 from two different views. The first input gear 41 of transmission unit 5 drives further reduced gears 31, 34, 32, 35, 33. Gears 31, 32, 33 carry the position codes 11, 12, 13 for measuring the number of turns of input shaft 2. The speed of each code gear 31, 32, 33 is stepped down by an intermediate gear 34, 35 from the respective preceding code gear 31, 32, 33. Apart from input gear 40 and the last gear 33 of the transmission unit 5, each gear has one part designated as wheel and one part designated as pinion positioned adjacent to each other in the direction of the axis of rotation. The two parts of the gears have a different toothing. The part of the gear designated as the wheel serves to pick up the rotary motion from the pinion of the preceding gear.

Scanning units 21, 22, 23 (units 21 and 22 are not represented in the drawing) detect the position codes 11, 12, 13. Gears 31, 32, 33, which carry the code magnets 11, 12, 13, are preferably cylindrical gears with axes of rotation parallel to each other and preferably parallel to the axis of rotation of input shaft 2. The dimensional standards 11, 12, 13 are arranged as alternatingly magnetized sectors along their circumferences and are preferably diametric permanent magnets. Magnets 11, 12, 13 preferably have identical cylindrical geometries and identical magnetic field strengths and lie in a common plane. Scanning units 21, 22, 23 preferably lie likewise in a common plane and each one is located opposite the magnetic dimensional standard 11, 12, 13 being detected.

The scanning units 10 for the detection of code disk 9 connected to input shaft 2 and scanners 21, 22, 23 for the detection of the magnetic dimensional standards 11, 12, 13 are semiconductors which are arranged on the side of circuit board 6 facing code disk 9.

In the multi-turn transmission unit 5 depicted in FIG. 2, the axis of rotation of the first driven gear 41 is perpendicular to the axis of rotation of drive gear 40 connected to input shaft 2. To provide gears 31, 32, 33, which carry the position magnets 11, 12, 13, with axes of rotation that are parallel to input shaft 2, the axis of rotation of gears 41 and 31 is again rotated 90° by means of another helical gear train consisting of the pinion of gear 41 and the wheel of gear 31. All other gears 34, 32, 35, 33 are cylindrical gears with axes of rotation that are parallel to the axis of rotation of the input shaft 2.

Figure 4:
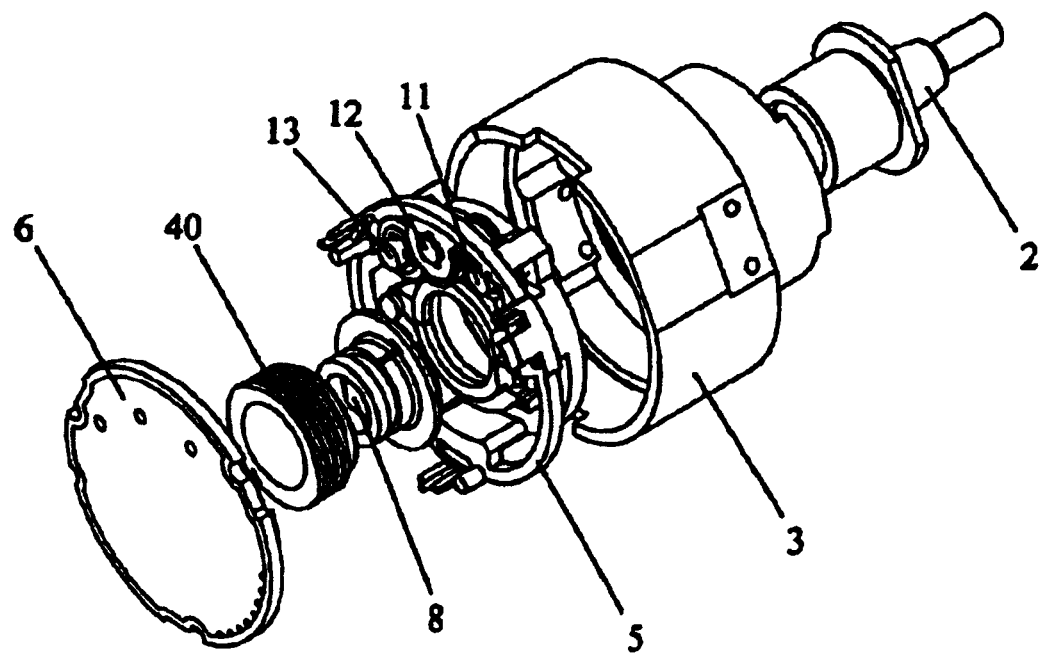
FIG. 4 is an exploded, perspective view of the multi-turn shaft encoder.

In the multi-turn shaft encoder depicted in FIGS. 1 and 4, all multi-turn gears 31, 32, 33, 34, 35, 40, 41, including the dimensional standards 11, 12, 13, of the multi-turn unit 5 are arranged entirely outside the circumference of dimensional standard 9 for the single stage.

Moreover, the dimensional standards 9, 11, 12, 13 for the single and multi-turn stages are on the same side of circuit board 6. Thus, the scanning units 10, 21, 22, 23 for detection of dimensional standards 9, 11, 12, 13 can all be arranged on the side of the circuit board 6 facing the dimensional standards. This is especially advantageous when the scanning units are connected to circuit board 6 in like manners, such as a Chip-on-Board (CoB), by wire bonding. Additional electronic components can be arranged on the circuit board 6 as SMD (surface mounted device).

Furthermore, other compact configurations are possible. For example, the transmission gear stages for the multi-turn unit can be partly or entirely within the circumference of code disk 9 of the single stage. The scanning units 10, 21, 22, 23 for the detection of the dimensional standard 9 of the single stage and the dimensional standards 11, 12, 13 of the multi-turn transmission stages can optionally be mounted on a single circuit board 6.

In a further alternative embodiment, the circuit board 6 can be positioned between the first dimensional standard 9 for detecting the angular position of input shaft 2 and the multi-turn unit 5. In this case as well, the scanning units for detecting the dimensional standards 9, 11, 12, 13 can be arranged on one circuit board 6.

In the sample embodiment represented in FIGS. 1 and 4, the first dimensional standard 9 is constructed by a transmissive code disk. However, it is also possible to use a reflective code disk according to the invention. In such a case, light transmitter 7 is positioned on the same side as the scanning unit 10. Preferably, the light transmitter 7 and the scanning unit 10 are arranged on a common circuit board 6.

For the detection of an optical code disk 9, the scanning unit 10 consists of photosensitive semiconducting layers structured according to the coding on the dimensional standard 9, which generate one or more analog or digital electrical position signals.

The scanning units 21, 22, 23 for the detection of the magnetic multi-turn dimensional standards 11, 12, 13 preferably consist of several magnetic sensors that are integrated on a semiconductor substrate, such as Hall or magnetoresistive (MR) sensors. The resolution of the angular position of the position magnets 11, 12, 13 serving as the dimensional standards, which is produced by evaluation circuits each connected to the scanning units 21, 22, 23, amounts to at least n bits, where $2^n$ is larger than the reduction factor between every two multi-turn gears 31, 32, 33 carrying the position magnets 11, 12, 13.

| | List of reference numbers |
|---|---|
| 1 | Source of rotation |
| 2 | Input shaft |
| 3 | Housing |
| 4 | Bearing |
| 5 | Multi-turn transmission unit |
| 6 | Circuit board |
| 7 | Transmitter |
| 8 | Collimator lens |
| 9 | Code disk/dimensional standard |
| 10, 21, 22, 23 | Scanning units |
| 11, 12, 13 | Magnets/dimensional standards |
| 31, 32, 33 | Code gears |
| 34, 35 | Intermediate gears |
| 40 | Input drive gear |
| 41 | Driven gear of the multi-turn unit 5 |
| 411 | Wheel of gear 41 |
| 411 | Pinion of gear 41 |
| $D_{40}, D_{41}$ | Axes of rotation of gears 40, 41 |
| $Z_{40}, Z_{41}$ | Teeth of gear 40 and of wheel 411 of gear 41 |

The invention claimed is:

1. Multi-turn angle measuring device (1) with a first dimensional standard (9), which is non-rotatably connected to an input shaft (2) and which is sampled with a first scanning unit (10) to determine an angular position of the input shaft (2), and with additional dimensional standards (11, 12, 13) that measure the number of turns of the input shaft (2), each additional dimensional standard (11, 12, 13) being reduced in speed by means of reduction gears from the preceding dimensional standard (9, 11, 12) arranged in parallel to each other, and a scanning device (21, 22, 23) for the sampling of each dimensional standard (11, 12, 13) arranged on a circuit board (6), wherein an input gear (40) connected to the input shaft (2) and a first transmission gear (41) have axes of rotation ($D_{40}, D_{41}$) that are not parallel to each other, flanks of teeth ($Z_{40}, Z_{41}$) of the input gear (40) and of a wheel (411) of the first transmission gear (41) are not parallel to the axis of input rotation ($D_{40}, D_{41}$) of the respective gears (40, 41), a number of the teeth ($Z_{40}$) of the input gear (40) is smaller than a number of the teeth ($Z_{41}$) of the wheel (411) of the first transmission gear (41), the following reduction gears are arranged parallel to the input shaft, and a pinion (412) of the first transmission gear (41) and the wheel of a second transmission gear (31) are configured as helical gears.

2. Multi-turn angle measuring device according to claim 1, wherein the input gear (40) connected to the input shaft (2) and the wheel (411) of the first transmission gear (41) are configured as helical gears.

3. Multi-turn angle measuring device according to claim 1, wherein the scanning unit (10) for the first dimensional standard (9) and the scanning units (21, 22, 23) of the additional dimensional standards (11, 12, 13) are arranged on a single circuit board (6).

4. Multi-turn angle measuring device according to claim 1, wherein the additional dimensional standards (11, 12, 13) are centrally carried by main gears (31, 32, 33) that have axes of rotation parallel to the input shaft (2) and driven via additional intermediate gears (34, 35) are arranged between the main gears, and wherein the gears (31, 32, 33, 34, 35, 41) are arranged on a single-piece multi-turn unit (5).

5. Multi-turn angle measuring device according to claim 1, wherein the other dimensional standards (11, 12, 13) comprise diametrically magnetized permanent magnets.

6. Multi-turn angle measuring device according to claim 1, wherein the first dimensional standard (9) is a transmissive Moiré code disk, which is illuminated by a transmitter (7) and which is detected by a photoelectric scanning unit (10).

7. Multi-turn angle measuring device according to claim 1, wherein the first dimensional standard (9) comprises one or more magnets, which are magnetized in sectors and detected by one or more magnetic sensors.

* * * * *